United States Patent
Yokota

(10) Patent No.: US 8,294,349 B2
(45) Date of Patent: Oct. 23, 2012

(54) LIGHTING DEVICE, DISPLAY DEVICE AND TELEVISION RECEIVER

(75) Inventor: Masashi Yokota, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 179 days.

(21) Appl. No.: 12/997,026

(22) PCT Filed: Jun. 5, 2009

(86) PCT No.: PCT/JP2009/060350
§ 371 (c)(1),
(2), (4) Date: Dec. 9, 2010

(87) PCT Pub. No.: WO2010/004820
PCT Pub. Date: Jan. 14, 2010

(65) Prior Publication Data
US 2011/0085091 A1    Apr. 14, 2011

(30) Foreign Application Priority Data
Jul. 11, 2008   (JP) .................................. 2008-181861

(51) Int. Cl.
*H01J 5/48* (2006.01)
*H01J 5/50* (2006.01)
(52) U.S. Cl. ......... 313/318.09; 313/318.01; 313/318.02; 313/318.03; 313/318.1; 313/318.12
(58) Field of Classification Search ............ 313/318.01–318.03, 318.05, 318.09–318.1, 318.12; 348/751, 348/761, 766, 790
See application file for complete search history.

(56) References Cited

U.S. PATENT DOCUMENTS
2006/0286831 A1   12/2006   Kwon et al.
2010/0066234 A1 *  3/2010   Mori et al. ............... 313/318.12
2010/0066916 A1 *  3/2010   Takata et al. .................. 348/725

FOREIGN PATENT DOCUMENTS
JP           08077981 A  *  3/1996
JP         2006-351527 A    12/2006
JP         2007-234551 A     9/2007

OTHER PUBLICATIONS

Official Communication issued in International Patent Application No. PCT/JP2009/060350, mailed on Sep. 8, 2009.

* cited by examiner

*Primary Examiner* — Anne Hines
*Assistant Examiner* — Jose M Diaz
(74) *Attorney, Agent, or Firm* — Keating & Bennett, LLP

(57) ABSTRACT

In a lighting device 10, a discharge tube 15 includes a glass tube 34, an electrode 34a, an outer lead 35 and a ferrule 36. The electrode 34a is arranged inside the glass tube 34. The outer lead 35 makes electrical connection between the electrode 34a and an external device. The ferrule 36 has a drum shape so as to be fitted onto the glass tube 34 and makes electrical connection between the outer lead 35 and the terminal 14. The ferrule 36 includes a main body 37, a connecting part 40 and a holding part 50. The main body 37 is fitted onto the glass tube 34. The connecting part 40 extends from the main body 37 and is electrically connected to the outer lead 35. The holding part 50 is separately provided from the connecting part 40 and extends from the main body 37. The holding part 50 holds the outer lead 35 and a relative position of the ferrule 36 to the glass tube 34 is defined with the holding part 50.

10 Claims, 18 Drawing Sheets

FIG.1
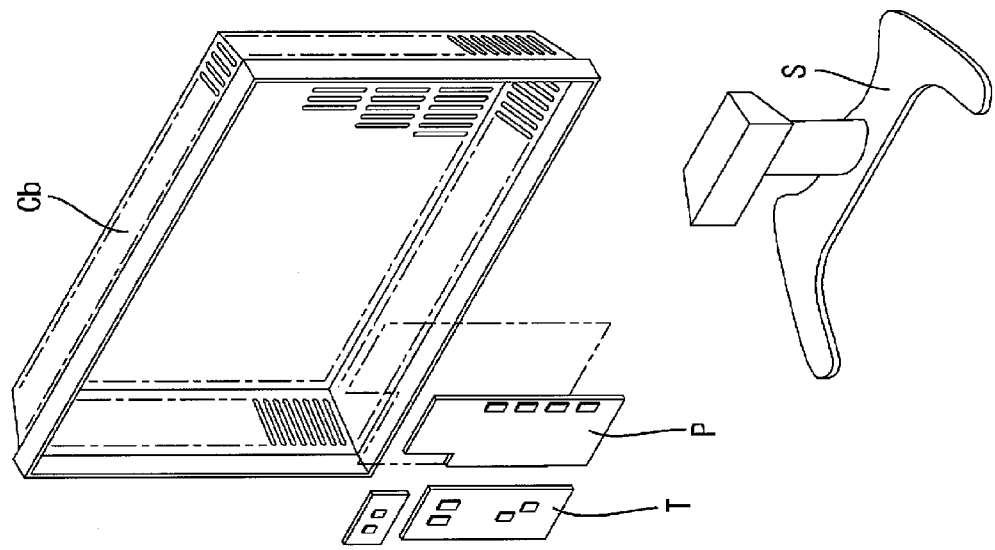
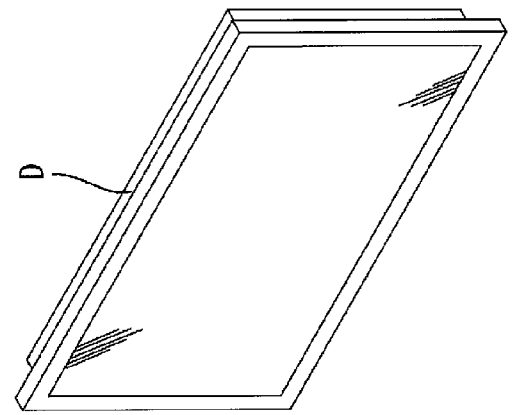
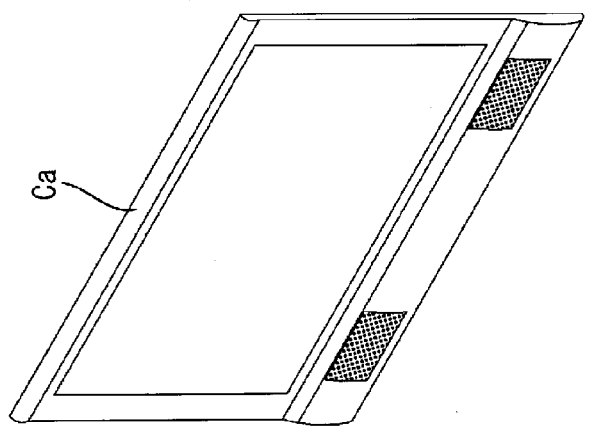

LIGHTING DEVICE, DISPLAY DEVICE AND TELEVISION RECEIVER

TECHNICAL FIELD

The present invention relates to a lighting device, a display device and a television receiver.

BACKGROUND ART

A liquid crystal display device used in a television receiver generally has a liquid crystal panel and a backlight unit arranged behind the liquid crystal panel. A known backlight unit includes lamps such as cold cathode tubes (discharge tubes), a chassis for housing the lamps and an inverter for driving the lamps. Such a backlight unit is disclosed in Patent Document 1.

Patent Document 1: Japanese Published Patent Application No. 2006-351527

Problem to be Solved by the Invention

The backlight unit disclosed in Patent Document 1 includes a printed circuit board (PCB) for connecting the lamps to the inverter. The PCB is mounted to the chassis and the lamps are fitted in electrically conductive clips arranged on the PCB so that power can be supplied to the lamps. Mounting structures of external electrodes provided at ends of each lamp are not disclosed in the above document. When mounting the external electrode to the lamp, a drum-shaped external electrode corresponding to the outer diameter of the lamp is prepared and the lamp is fitted in the drum-shaped external electrode. To maintain the relative position of the lamp to the external electrode, slits are provided in the external electrode to form an elastic tab. In this case, the elastic tab may be caught by the clip and thus the lamp may not be properly seated in the clip.

DISCLOSURE OF THE PRESENT INVENTION

The present invention was made in view of the foregoing circumstances. An object of the present invention is to provide a lighting device in which improper mounting of a discharge tube to a terminal is less likely to occur, a proper relative position of a ferrule (i.e., an external electrode) is maintained, and the discharge tube is driven with high reliability. Other objects are to provide highly reliable display device and television receiver.

Means for Solving the Problem

To solve the above problem, a lighting device of the present invention includes a discharge tube and a terminal for supplying power to the discharge tube. The discharge tube includes a glass tube, an electrode provided inside the glass tube, an outer lead provided at an end of the glass tube and configured to make electrical connection between the electrode and an external device, and a ferrule. The ferrule has a drum shape so as to be fitted onto the glass tube and configured to make electrical connection between the outer lead and the terminal. The ferrule includes a main body, a connecting part, and a holding part. The main body is fitted onto the glass tube. The connecting part extends from the main body and is electrically connected to the outer lead. The holding part separately provided from the connecting part extends from the main body. It is formed so as to hold the outer lead such that holding of the outer lead defines a relative position of the ferrule to the glass tube.

Because the holding part separately provided from the connecting part in the lighting device defines the relative position of the ferrule to the glass tube, the ferrule does not require cutouts for forming an elastic tab. Therefore, an outer surface of the ferrule is less likely to catch a part of the terminal and improper mounting of the ferrule to the terminal is less likely to occur. Namely, improper mounting of the discharge tube to the terminal is less likely to occur and the proper relative position of the ferrule to the glass tube is maintained. As a result, the discharge tube is driven with high reliability.

BRIEF DESCRIPTION OF THE DRAWINGS

[FIG. 1] is an exploded perspective view illustrating a general construction of a television receiver according to an embodiment of the present invention;

BEST MODE FOR CARRYING OUT THE INVENTION

An embodiment of the present invention will be explained with reference to figures. Namely, a liquid crystal display device including a lighting device of the present invention as a backlight unit and a television receiver including the liquid crystal display device will be explained.

Overview of Television Receiver TV

Figure 2:
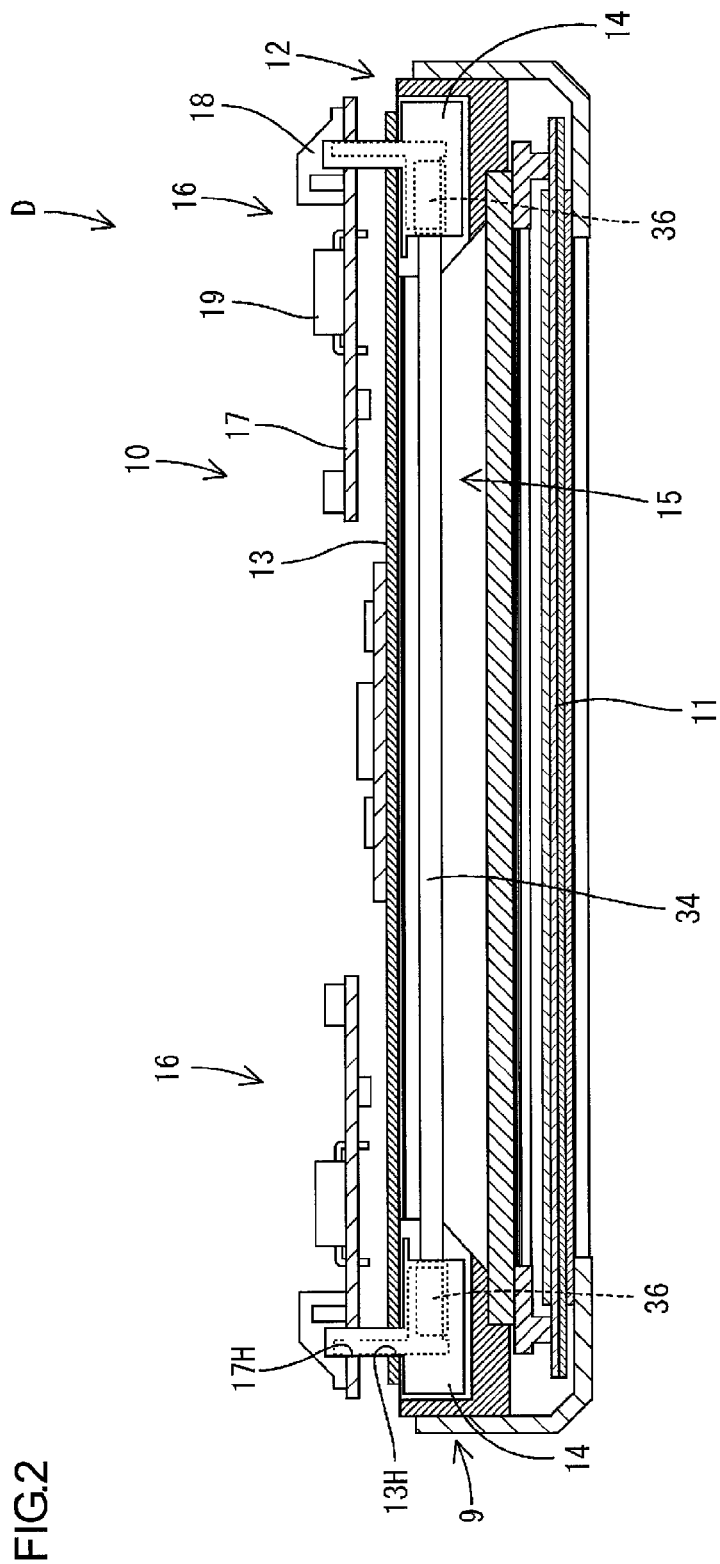
[FIG. 2] is a horizontal cross-sectional view of a liquid crystal display device included in the television receiver.
Figure 3:
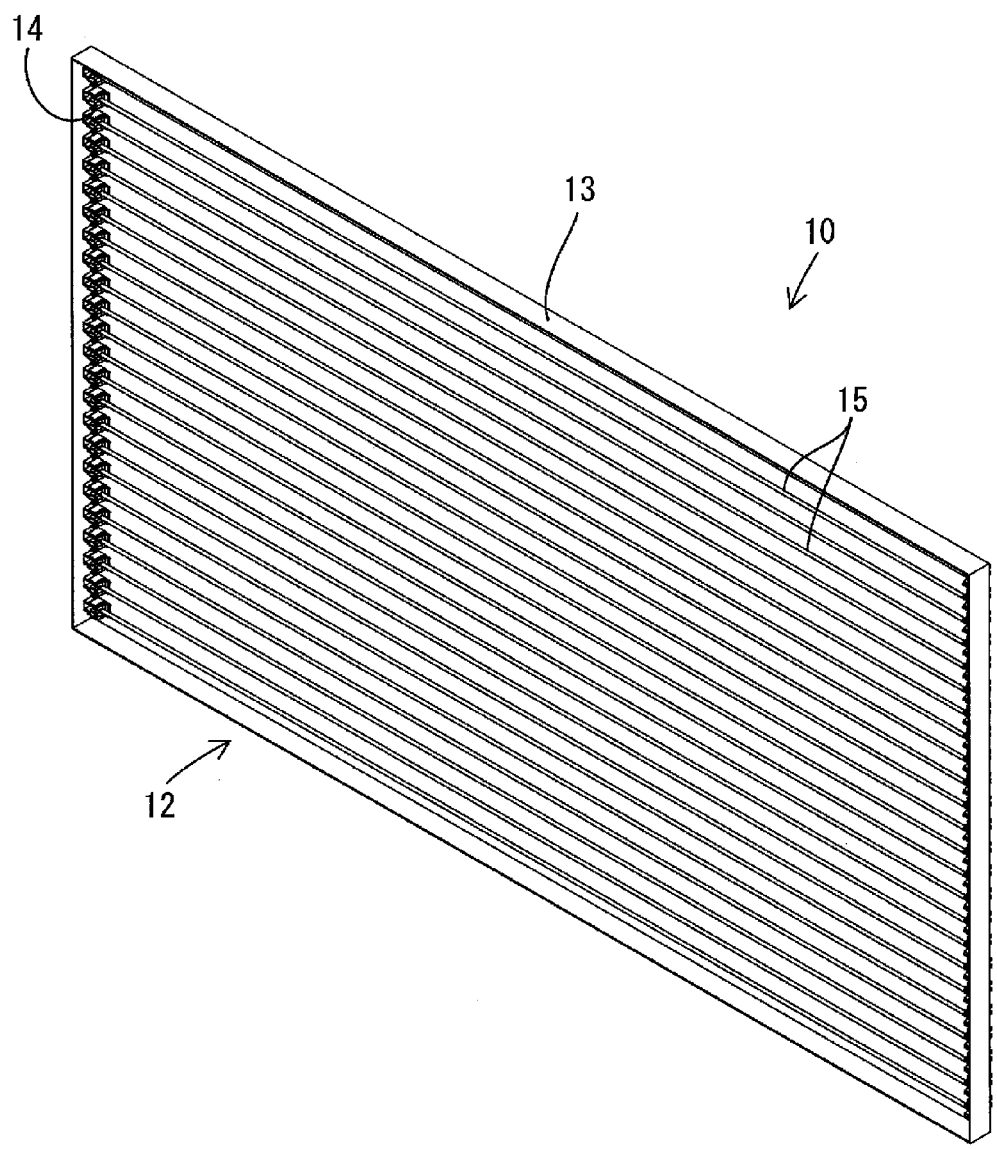
[FIG. 3] is a front perspective view of a lighting device included in the liquid crystal display device.
Figure 4:
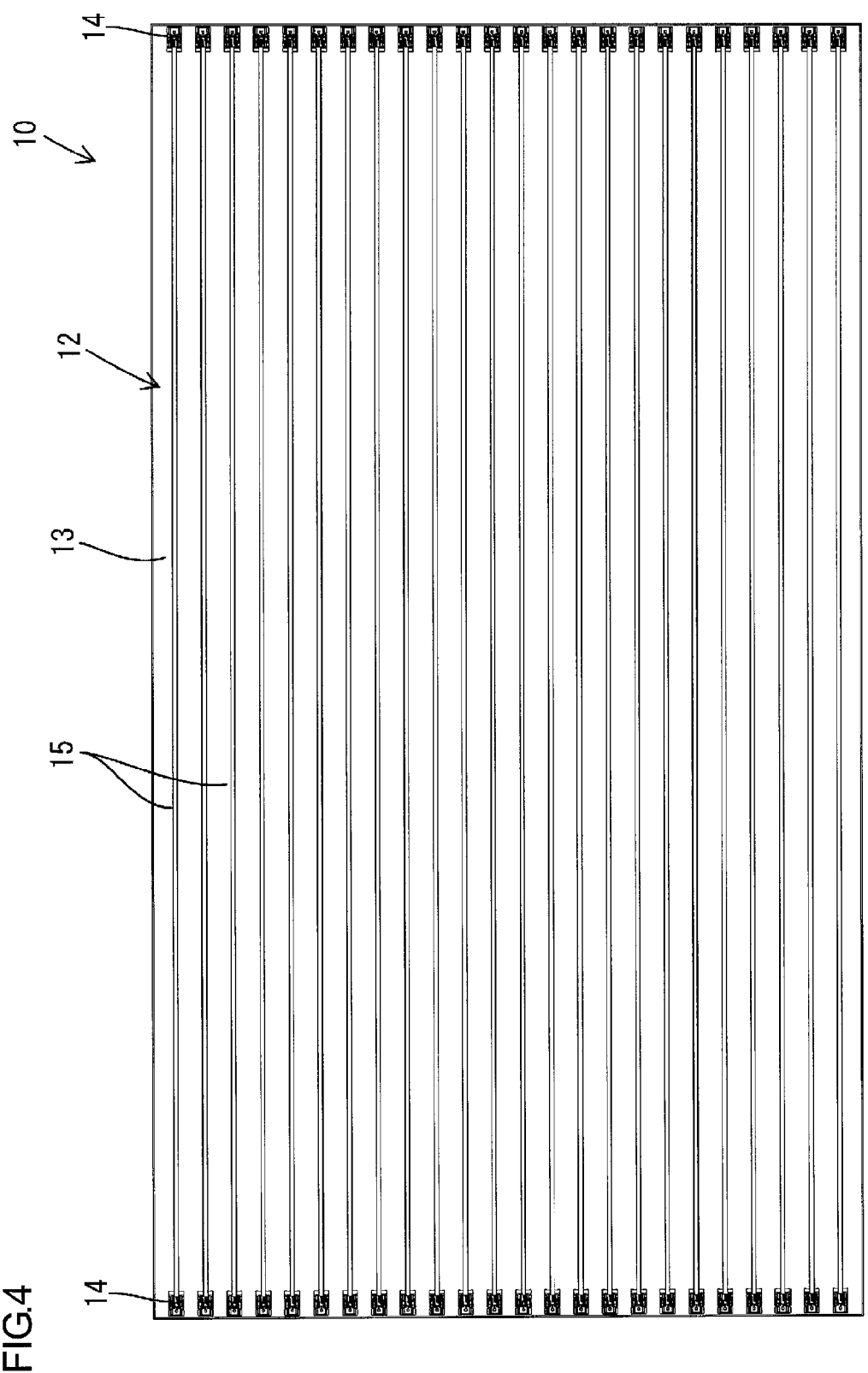
[FIG. 4] is a front view of the lighting device.

FIG. 1 is an exploded perspective view illustrating a general construction of the television receiver TV according to this embodiment. FIG. 2 is a horizontal cross-sectional view of the liquid crystal display device D included in the television receiver TV. FIG. 3 is a front perspective view of the lighting device 10 included in the liquid crystal display device D. FIG. 4 is a front view of the lighting device 10.

As illustrated in FIG. 1, the television receiver TV includes the liquid crystal display device (a display device) D, front and rear cabinets Ca, Cb that house the liquid crystal display device D therebetween, a power source P, a tuner T and a stand S.

An overall shape of the liquid crystal display device D is a landscape rectangular. As illustrated in FIG. 2, the liquid crystal panel 11, which is a display panel, and the lighting device 10, which is an external light source for the liquid crystal panel 11, are held together by a bezel 9 that is fitted to them from the front side (i.e., the display surface side). The liquid crystal panel 11 is arranged in front of the lighting device 10. The lighting device 10 illuminates the liquid crystal panel 11 from the rear.

The liquid crystal panel 11 has a known structure in which liquid crystals that change optical characteristics according to application of voltage are sealed between a pair of glass substrates. On a TFT substrate, which is one of the glass substrates, thin film transistors (TFTs) connected to source lines and gate lines are provided as switching components. The source lines and the gate lines are perpendicular to each other. Pixel electrodes arranged in a matrix and connected to the TFTs are also provided on the TFT substrate. On a CF substrate, which is the other substrate, a color filter having red (R), green (G) and blue (B) primary color sections arranged in a matrix is provided.

The lighting device 10 includes a lamp unit 12 and a power board (an inverter board) 16. The lamp unit 12 includes a metal chassis 13, a plurality of discharge tubes (light sources) and a plurality of relay connectors (terminals) 14. The chassis 13 has a landscape rectangular overall shape. The discharge tubes 15 are arranged parallel to each other and from top to bottom so as to be held along the flat surface of the chassis 13. The relay connectors 14 provided for respective discharge tubes 15 are arranged along right and left side edges of the chassis 13 from top to bottom. The power board 16 is arranged on the rear surface side of the chassis 13 and supplies power to the discharge tubes 15 via the relay connectors 14.

The chassis 13 has mounting holes 13H that are through holes formed at positions that overlaps ends of the discharge tubes 15 when viewed in plan and arranged in line from top to bottom. Each mounting hole 13H has a substantially rectangular shape. The relay connectors 14 are inserted in the respective mounting holes 13H so as to project to the other side. The expression "when viewed in plan" above means that the display surface of the liquid crystal display device D is viewed from the front side.

The Relay Connectors (Terminals) 14

Figure 5:
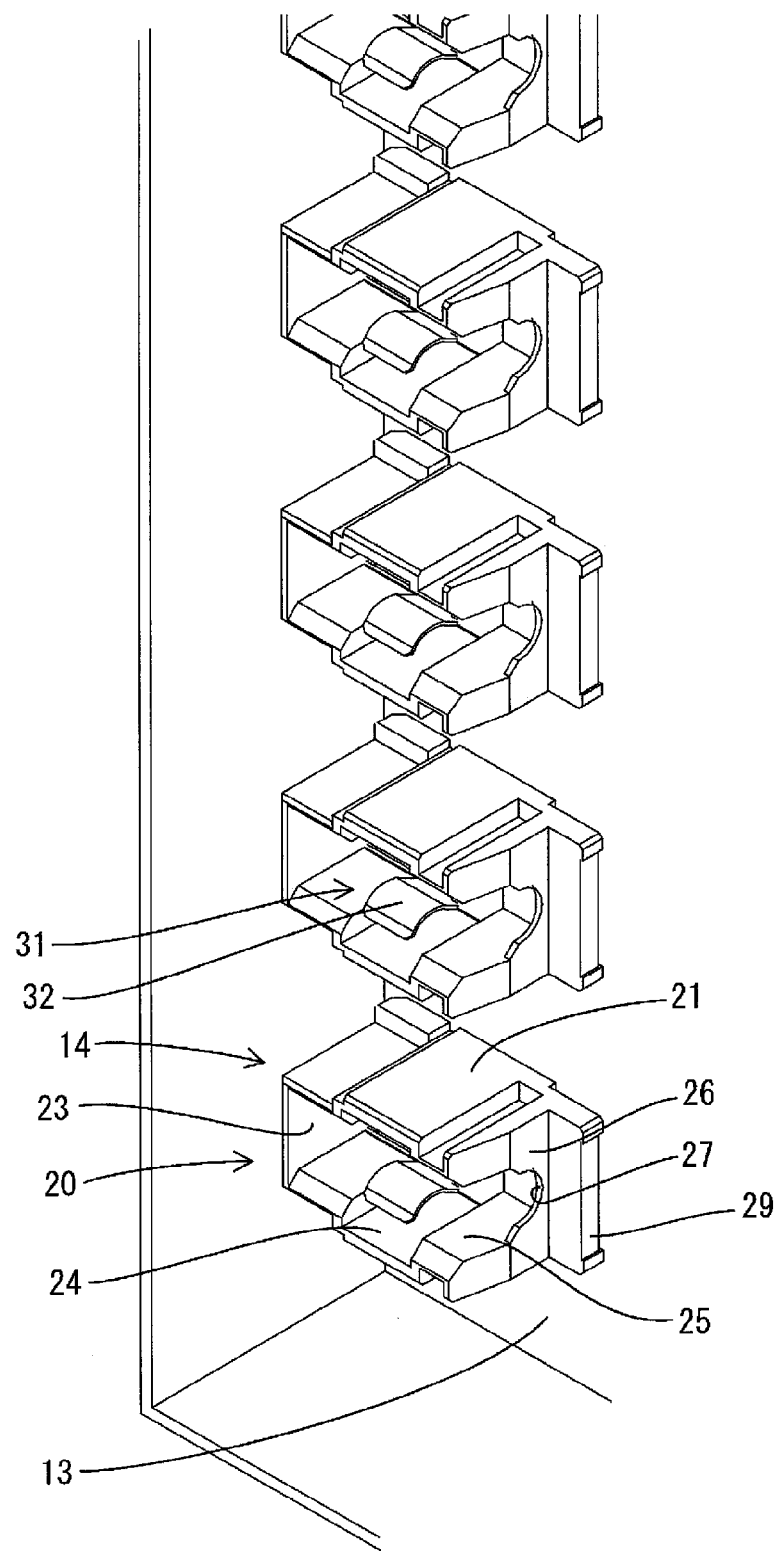
FIG. 5 is a perspective view illustrating relay connectors.
Figure 6:
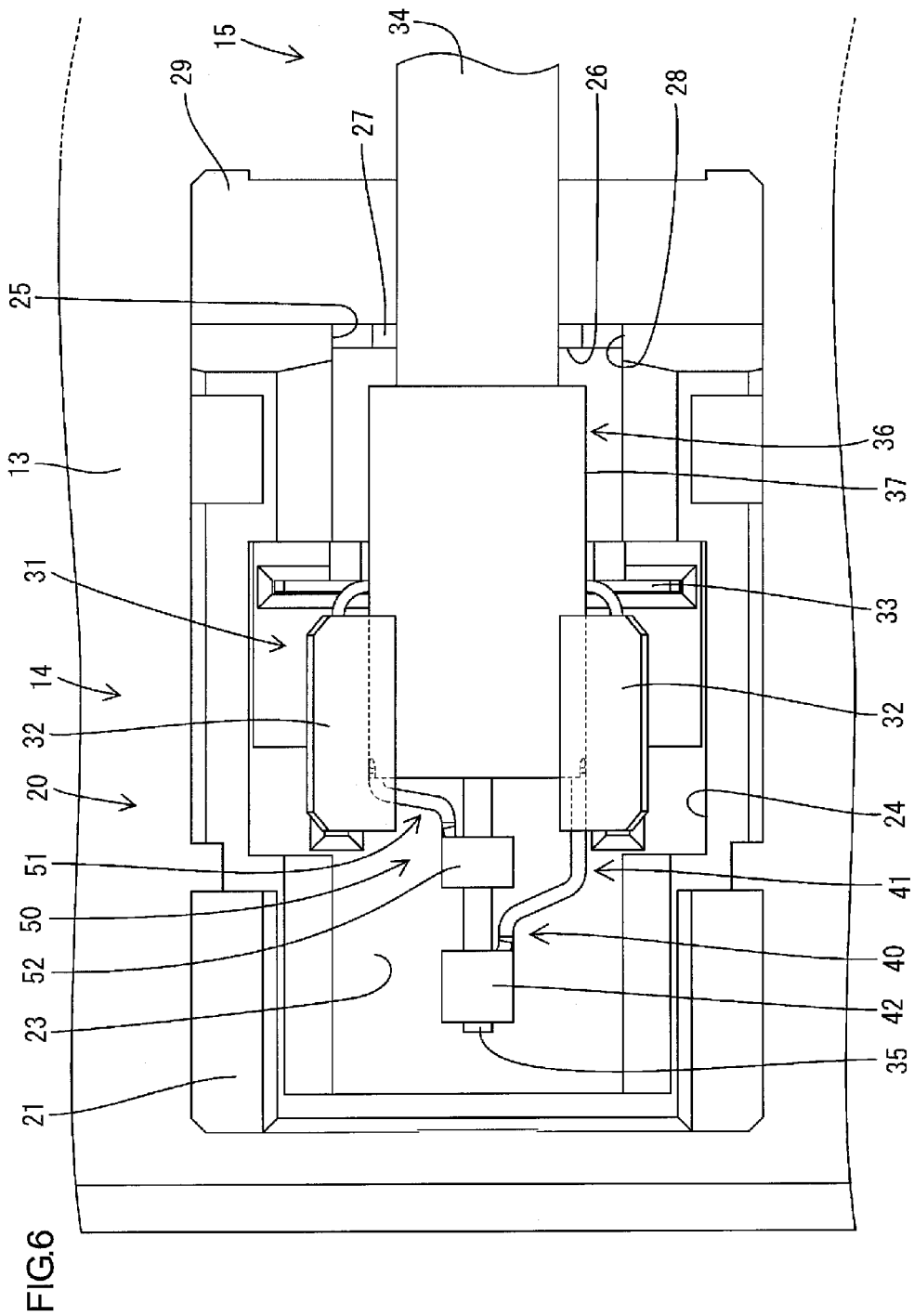
[FIG. 6] is a magnified partial view illustrating a connecting structure between the relay connector and the discharge tube.
Figure 7:
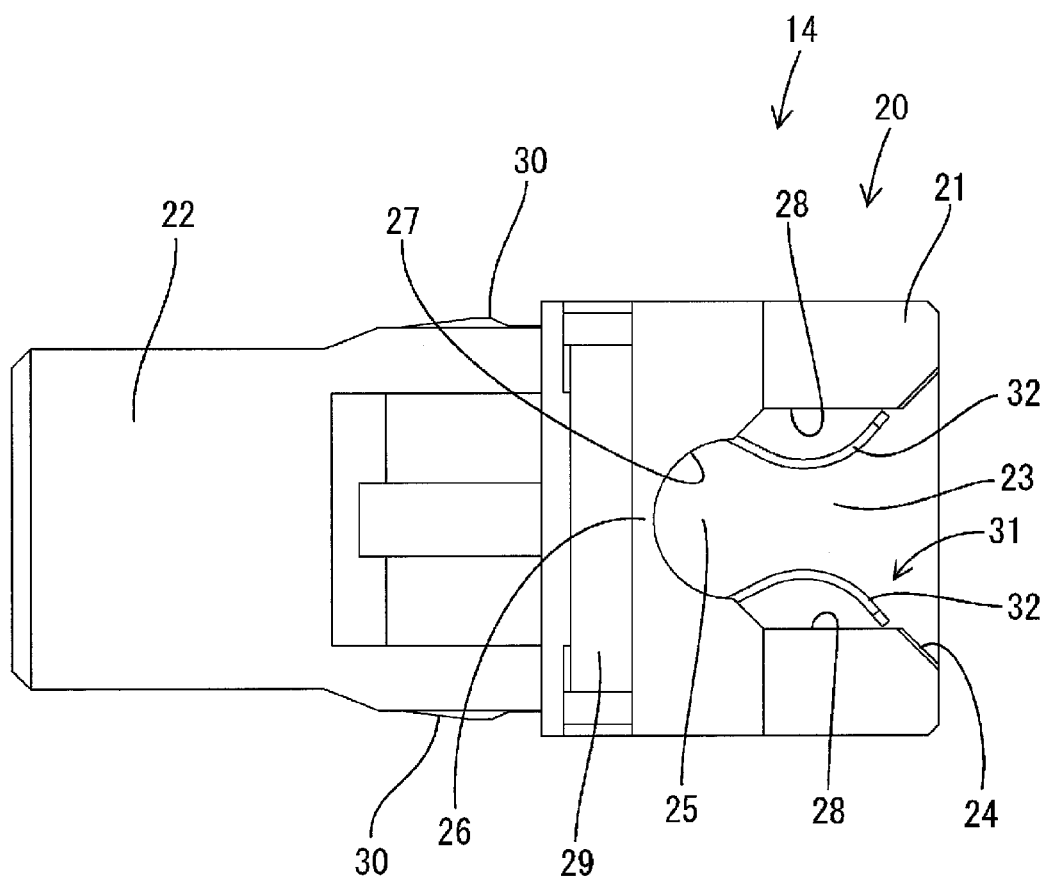
[FIG. 7] is a side view of the relay connector.
Figure 8:
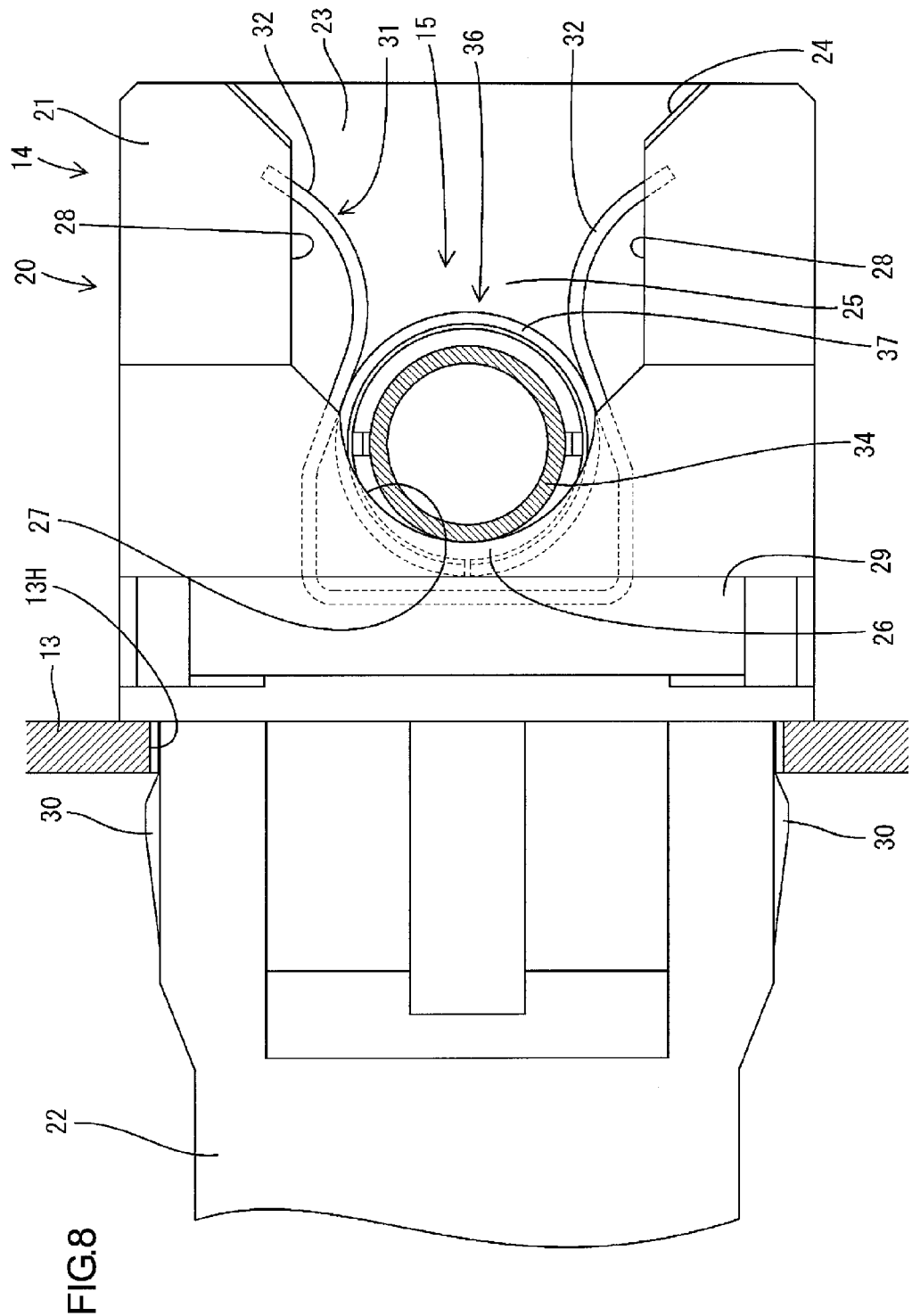
[FIG. 8] is an explanatory view illustrating a ferrule of the discharge tube fitted in the relay connector.
Figure 9:
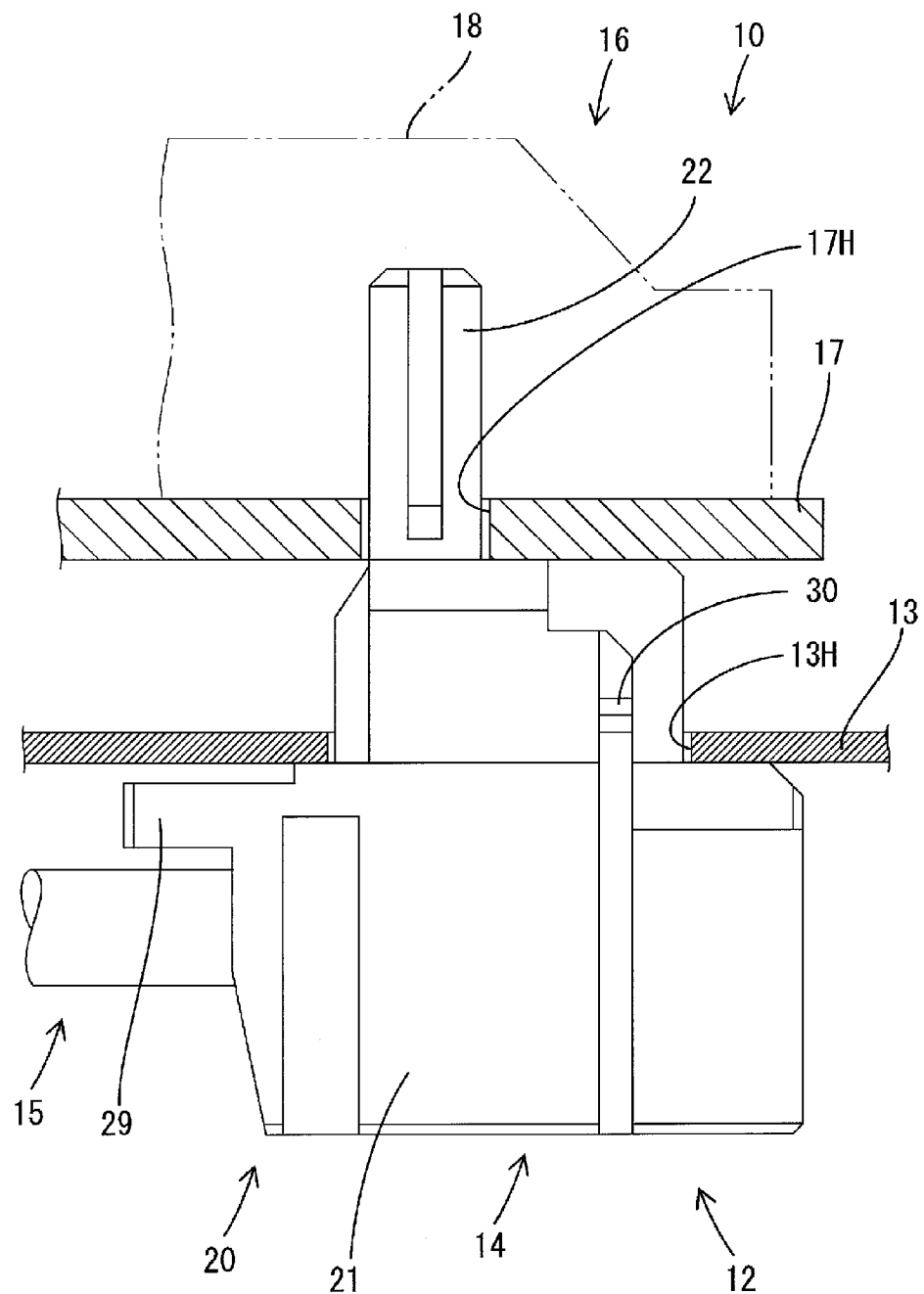
[FIG. 9] is a cross-sectional view illustrating a connecting structure between the relay connector and a power board.

FIG. 5 is a perspective view illustrating relay connectors 14. FIG. 6 is a magnified partial view illustrating a connecting structure between the relay connector 14 and the discharge tube 15. FIG. 7 is a side view of the relay connector 14. FIG. 8 is an explanatory view illustrating a ferrule 36 of the discharge tube 15 fitted in the relay connector 14. FIG. 9 is a cross-sectional view illustrating a connecting structure between the relay connector 14 and the power board 16.

Each relay connector 14 includes a synthetic resin holder 20 and a metal relay terminal (a connecting metal piece) 31 housed in the holder 20. The relay terminal 31 is made of stainless steel and the like.

Each holder 20 has a box portion 21 and a wall portion 22. The box portion 21 has a block-like overall shape. The wall portion 22 projects from the rear surface of the box portion 21 (on the rear surface side of the chassis 13) toward the rear.

The box portion 21 includes a holding area 23 that opens from the front to the side (on the side opposite from a side edge side of the chassis 13). The front opening of the holding area 23 is a ferrule receiving opening (a ferrule receiving portion) 24 for fitting the end of the discharge tube 15 (i.e., the ferrule 36) into the holding area 23 from the front side. The side opening is an escape opening 25 configured to avoid interference to the glass tube 34 of the discharge tube 15, which could occur when the end of the discharge tube 15 is inserted in the holding area 23. A plate-like stopper 26 projects inward from the opening edge of the escape opening 25. With the stopper 26 having a substantially U shape opening, the escape opening 25 is formed in to the U shape and reduced in size. A vertical size of the opening of the escape opening 25 is smaller than an inner diameter of a main body 37 of the ferrule 36 and equal to or slightly larger than an outer diameter of the glass tube 34. A back end area of the edge of the escape opening 25 is formed as a concave portion 27. A curvature radius of the concave portion 27 is equal to or larger than a curvature radius of a periphery of the glass tube 34. Parts of the edge of the escape opening 25 that is located more to the front than the concave portion 27 are guide portions 28 provided as a pair, one of which is located at the top and the other at the bottom.

The box portion 21 includes an extending section 29 that extends from the outer surface of the stopper 26 around the edge of the escape opening 25 along the surface of the chassis 13. The extending section 29 is formed so as to separate the escape opening 25 from the front surface of the chassis 13.

Furthermore, stopper protrusions 30 are formed on the outer surfaces (of the upper part and the bottom part) of the wall portion 22. The stopper protrusions 30 stop the relay connector from coming off of the chassis 13.

The relay terminal 31 is held inside the holder 20. The relay terminal 31 is prepared by bending a metal plate punched in a predetermined shape. It includes a pair of elastic pressing pieces 32 that are curved plates and vertically symmetric to each other, and a board connecting portion 33 that has a plate-like shape and projects toward the rear. The elastic pressing pieces 32 are housed in the holding area 23 such that they can be bent away from each other. The smallest distance between the elastic pressing pieces 32 in the free state when they are not elastically bent is smaller than the outer diameter of the main body 37 of the ferrule 36 of the discharge tube 15. The board connecting portion 33 projects from the rear surface of the box portion 21 to the outside of the holder 20 and extends along the wall portion 22 toward the rear.

To mount the relay connector 14 to the chassis 13, the wall portion 22 of the holder 20 is inserted from the inner side of the chassis 13 to the mounting hole 13H until the stopper protrusions 30 are engaged to the opening edge of the rear surface of the chassis 13 around the mounting hole 13H. A part of the chassis 13 is sandwiched between the outer surface of the box portion 21 and the stopper protrusions 30. As a result, the holder 20 is fixed to the chassis 13 such that the movement thereof in the insertion direction (the direction in which the mounting hole 13H breaks through) is restricted. The mounting of the relay connector 14 to the chassis 13 is complete. When the relay connector 14 is mounted to the chassis 13, the box portion 21, which is a front-end portion of the holder 20, projects (or exposed) on the front side of the chassis 13 and the wall portion 22, which is a rear-end of the holder 20, projects (or exposed) on the rear surface side of the chassis 13.

Discharge Tube 15

Figure 10:
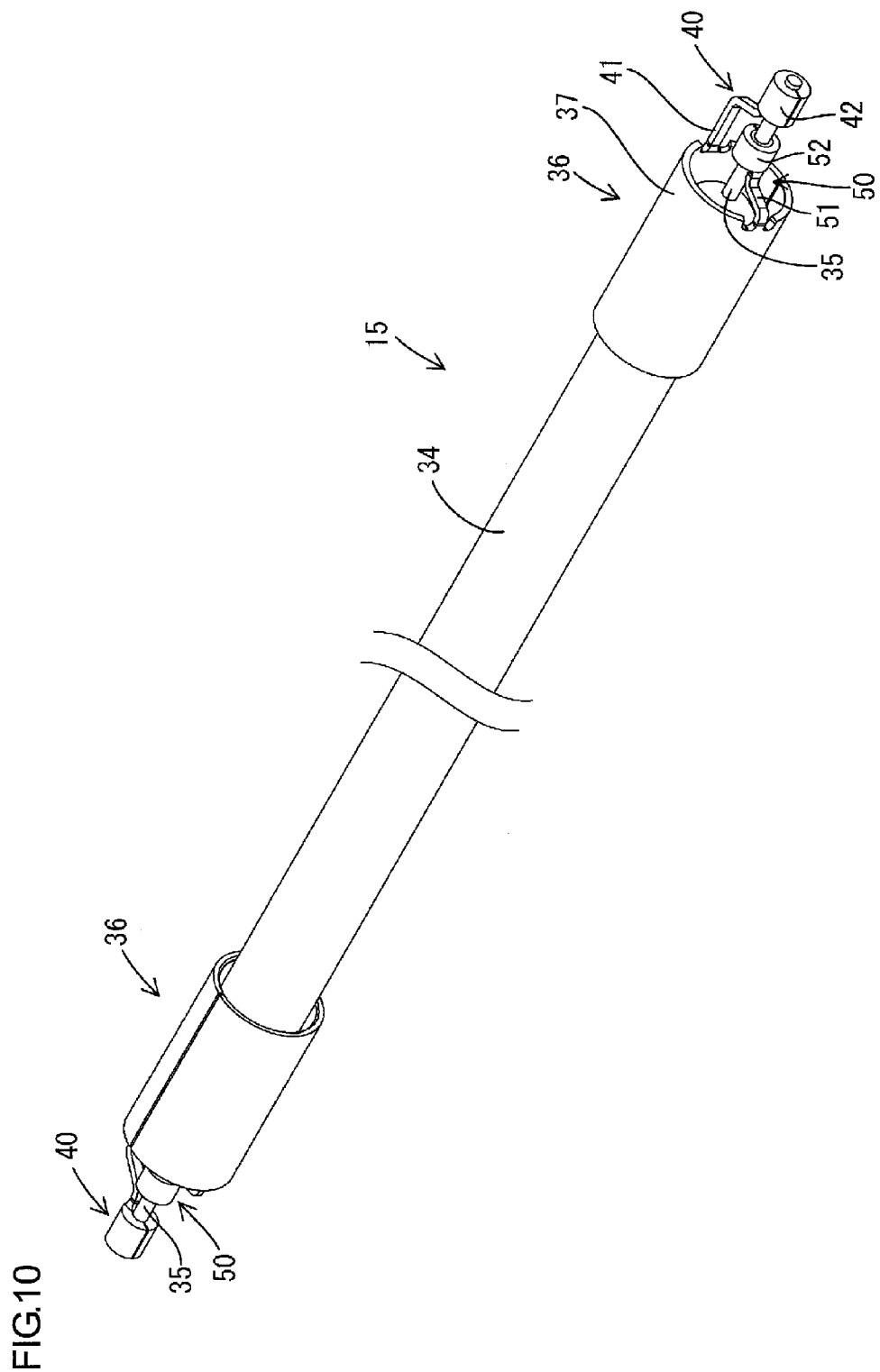
[FIG. 10] is a perspective view of the discharge tube.
Figure 11:
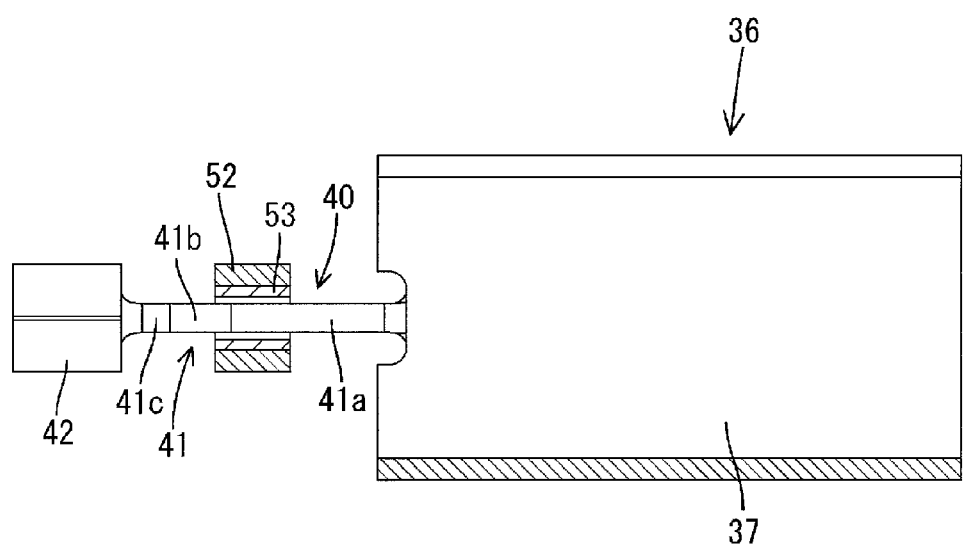
[FIG. 11] is a first cross-sectional view illustrating the ferrule including an electrically conductive part along the axial direction.
Figure 12:
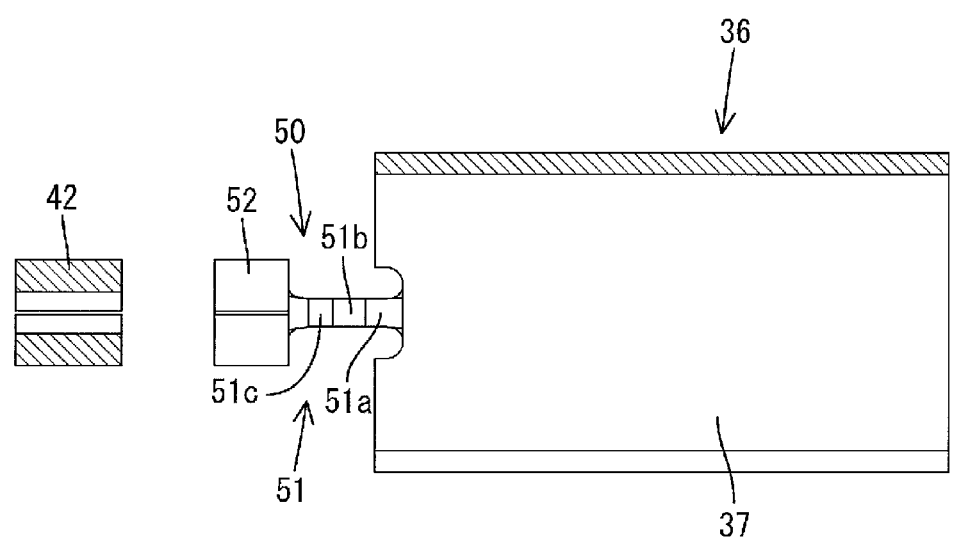
[FIG. 12] is a second cross-sectional view illustrating the ferrule including a holding part along the axial direction.
Figure 13:
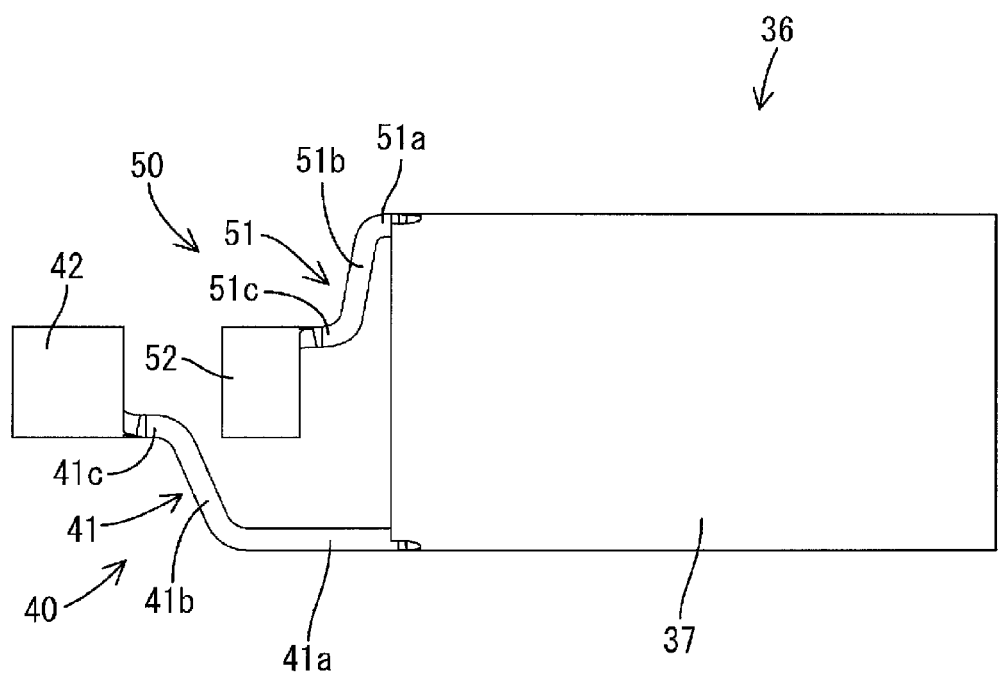
[FIG. 13] is a front view of the ferrule.
Figure 14:
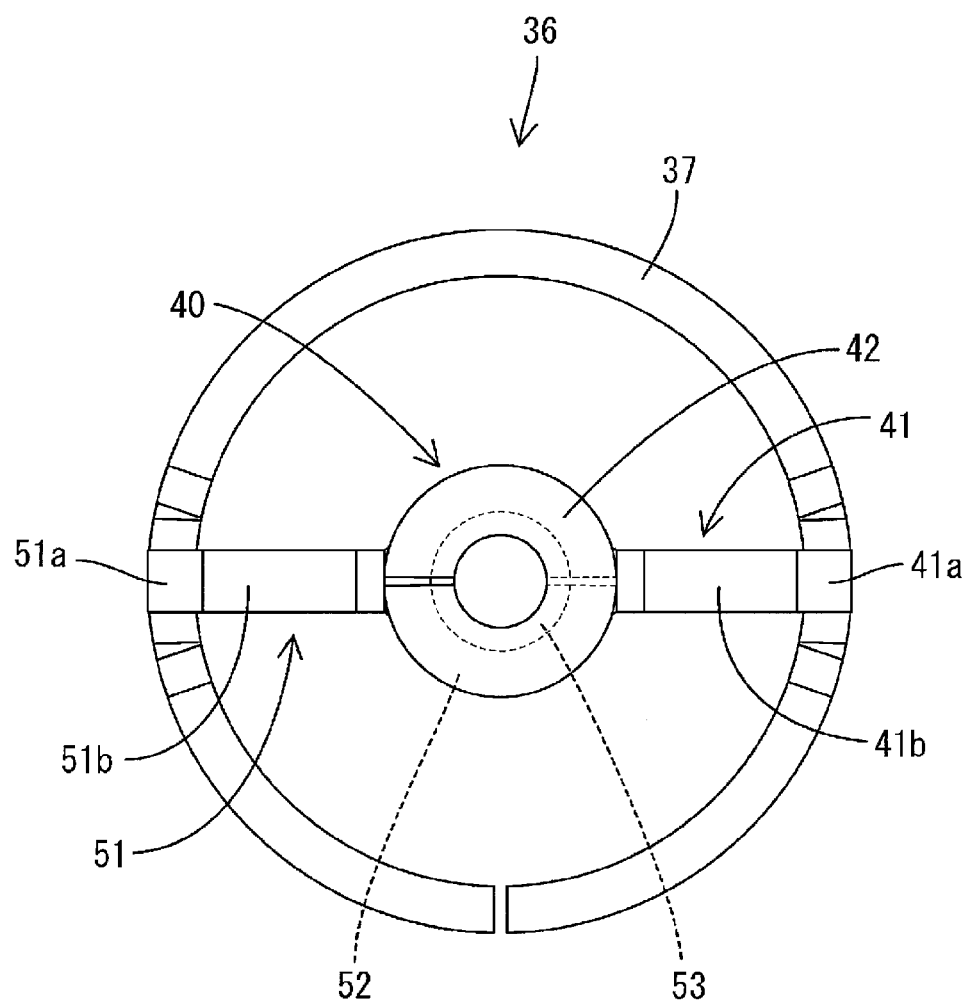
[FIG. 14] is a plan view of the ferrule.
Figure 15:
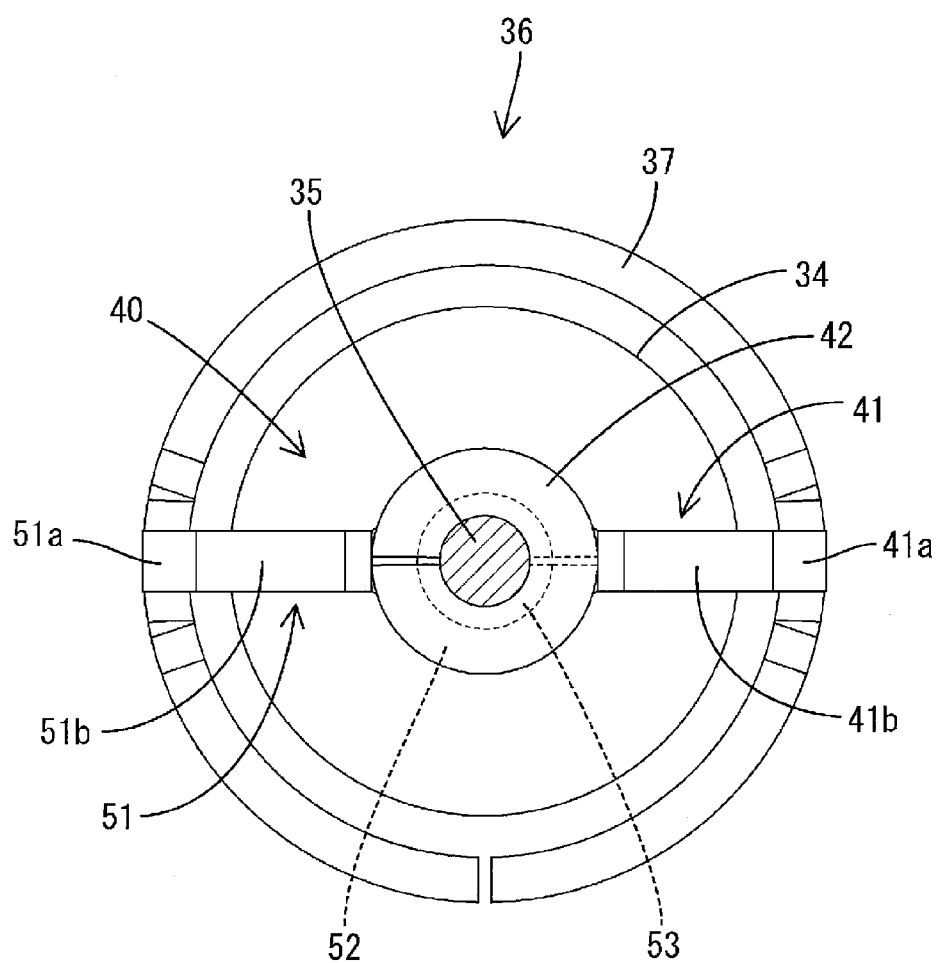
[FIG. 15] is a plan view illustrating the ferrule fitted onto a glass tube.
Figure 16:
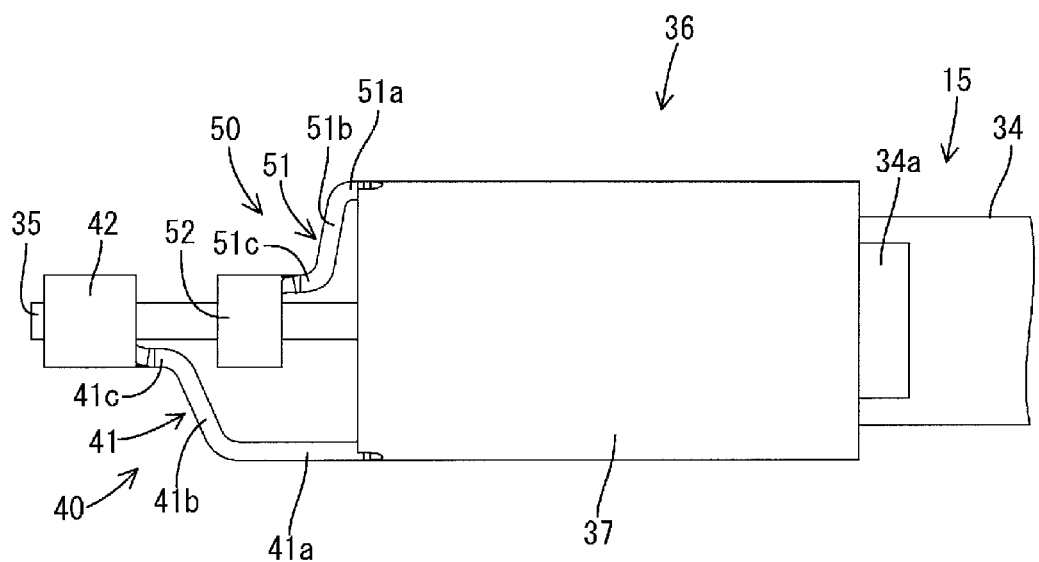
[FIG. 16] is a magnified front view illustrating the ferrule fitted onto the glass tube.
Figure 17:
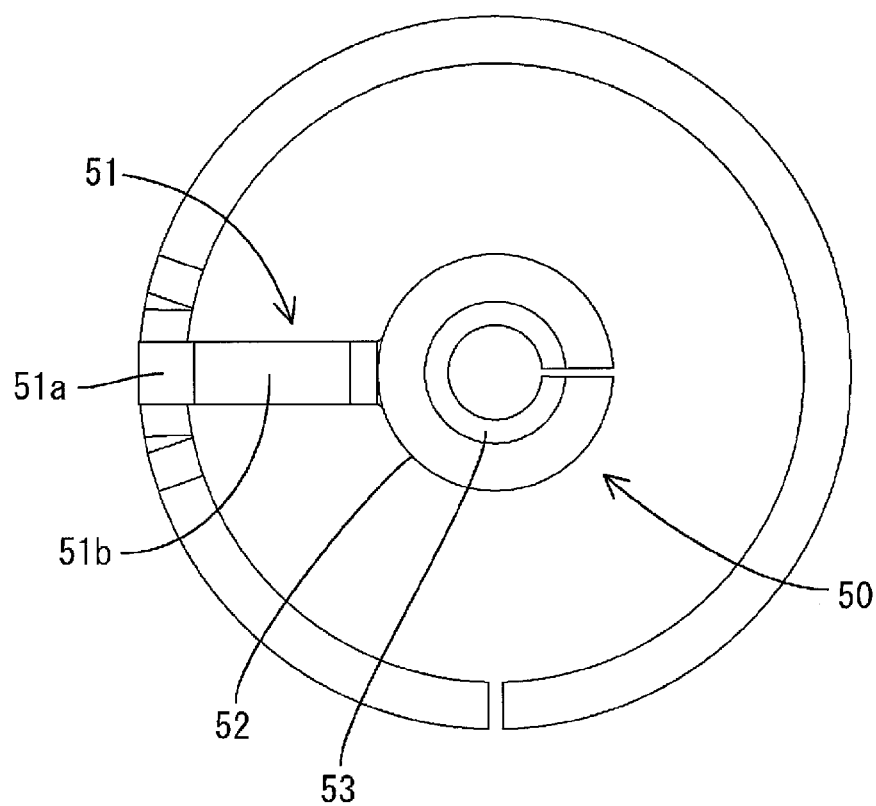
[FIG. 17] is an explanatory view schematically illustrating the holding part.
Figure 18:
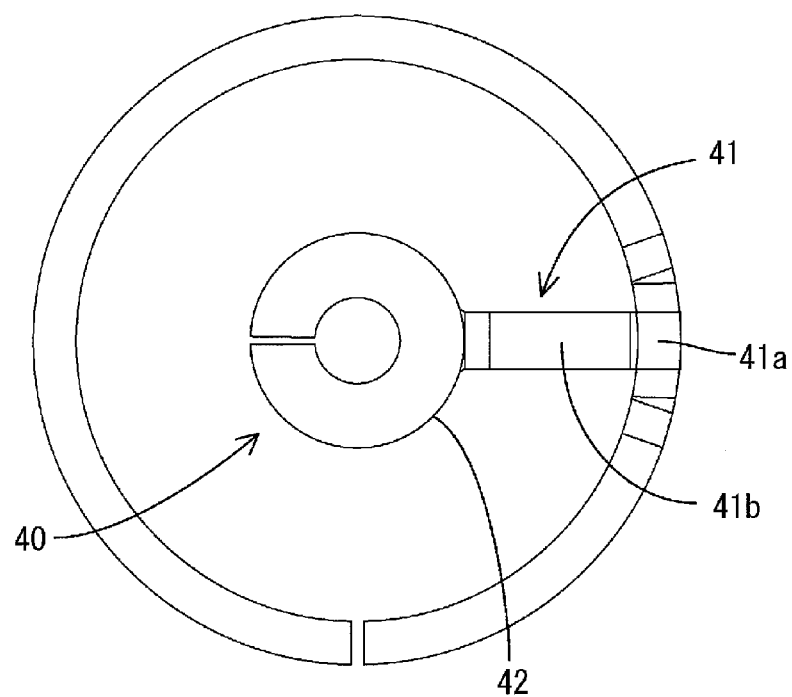
[FIG. 18] is an explanatory view schematically illustrating the electrically conductive part.

FIG. 10 is a perspective view of the discharge tube 15. FIG. 11 is a first cross-sectional view illustrating the ferrule 36 including an electrically conductive part 40 along the axial direction. FIG. 12 is a second cross-sectional view illustrating the ferrule 36 including a holding part 50 along the axial direction. FIG. 13 is a front view of the ferrule 36. FIG. 14 is a plan view of the ferrule 36. FIG. 15 is a plan view illustrating the ferrule 36 fitted to the glass tube 34. FIG. 16 is a magnified front view illustrating the ferrule 36 fitted to the glass tube 34. FIG. 17 is an explanatory view schematically illustrating the holding part 50. FIG. 18 is an explanatory view schematically illustrating the electrically conductive part 40.

The discharge tubes 15 are cold cathode tubes. Each discharge tube 15 includes an elongated linear glass tube 34 with a circular cross-section. A diameter of the glass tube 34 is 3 mm. It further includes electrodes 34a, outer leads 35 and ferrules 36. The electrodes 34a are arranged inside the glass tube 34. The outer leads 35 are elongated metal pieces that project from the respective ends of the glass tube 34 linearly and concentrically with the glass tube 34. Each outer lead 35 has a circular cross-section. It made of nickel or cobalt containing metal and electrically connected to the corresponding electrode 34a. The ferrules 36 are mounted onto the respective ends of the glass tube 34. Mercury is enclosed in the glass tube 34. Each end of the glass tube 34 is formed in a substantially dome shape by melting the glass with heat. The corresponding outer lead 35 penetrates through the dome portion.

Each ferrule 36 is a single piece part prepared by bending or hammering a metal plate (e.g., made of stainless steel) punched in a predetermined shape. The ferrule 36 includes one main body 37, one electrically conductive part (a connecting part) 30, and one holding part 50, which is separately provided from the conductive part 40. The conductive part 40 electrically connects the main body 37 to the outer lead 35. The holding part 50 holds the outer lead 35 and defines a relative position of the ferrule 36 (or the main body 37) to the glass tube 34.

The main body 37 has a drum-like overall shape with a cross section concentric with the glass tube 34. The inner diameter of the main body 37 is slightly larger than an outer diameter of the glass tube 34 such that a predetermined clearance 78 (see FIG. 15) is provided between the glass tube 34 and the main body 37. The outer diameter of the main body 37 is defined such that the main body 37 can be fitted in the ferrule receiving opening (ferrule receiving portion) 24 of the relay connector 14 and held between elastically deformed elastic pressing pieces 32, 32. As illustrated in FIG. 16, the inner end of the main body 37 (i.e., the inner end of the ferrule 36) is positioned outside the innermost end of the electrode 34a with respect to the axial direction of the glass tube 34. The periphery of the main body 37 is a continuous surface without any cutouts and thus less likely to catch other members.

The main body 37 includes the conductive portion 40 that extends from the front end of the main body 37 forward. The conductive portion 40 includes an arm portion 41 continues from the front edge of the main body 37 and a drum portion (a contact portion) 42 located more to the front than the front end (the distal end) of the arm portion 41. As illustrated in FIGS. 11, 13, 14 and 18, the arm portion 41 includes a base end section 41a, a middle section 41b and a top end section 41c. The base end section 41a extends from the main body 37 on the same plane with respect to the main body 37 and parallel to the axis of the main body 37. The meddle section 41b extends from the distal end of the base end section 41a inward in the radial direction toward the axis of the main body 37. The top end section 41c extends from the distal end of the middle section 41b parallel to the axis of the main body 37. The drum portion 42 continues from the distal end of the top end section 41c. A width of the arm portion 41 is sufficiently smaller than a length thereof. Therefore, the arm portion 41 is elastically flexible in the radial direction of the main body 37 or in a direction that crosses the radial direction (a direction that crosses a length direction of the arm portion 41), or elastically twisted around itself as a torsion axis. The drum portion 42 is formed by bending apart of the arm portion 41 extending from the distal end of the arm portion 41 toward right and left. The part of the arm portion 41 is bent so as to form a drum shape. The drum portion 42 is positioned such that the axis thereof substantially matches the axis of the main body 37. The electrical connection is created between the outer lead 35 and the main body 37 when contact between the drum portion 42 and the top end of the outer lead 35 is made.

The holding part 50 is a cantilever part that extends from the front end edge of the main body 37 forward so as to face the conductive part 40. The holding part 50 includes an arm portion 51 and a drum portion (a contact portion) 52. The arm portion 51 continues from the front edge of the main body 37 and the drum portion 52 located more to the front than the front end (the distal end) of the arm portion 51. As illustrated in FIGS. 12 to 14 and 17, the arm portion 51 includes a base end section 51a, a middle section 51b and a top end section 51c. The base end section 51a extends from the main body 37 on the same plane with respect to the main body 37 and parallel to the axis of the main body 37. The meddle section 51b extends from the distal end of the base end section 51a inward in the radial direction toward the axis of the main body 37. The top end section 51c extends from the distal end of the middle section 51b parallel to the axis of the main body 37. The drum portion 52 continues from the distal end of the top end section 51c. A width of the arm portion 51 is sufficiently smaller than a length thereof. Therefore, the arm portion 51 is elastically flexible in the radial direction of the main body 37 or in a direction that crosses the radial direction (a direction that crosses a length direction of the arm portion 51), or elastically twisted around itself as a torsion axis. The drum portion 52 is formed by bending apart of the arm portion 51 extending from the distal end of the arm portion 51 toward right and left. The part of the arm portion 51 is bent so a to form a drum shape. The drum portion 52 is positioned such that the axis thereof substantially matches the axis of the drum portion 42. The drum portion 52 is configured to hold a middle section of the outer lead 35. As illustrated in FIGS. 14 and 15, a resin cushion member 53 is arranged inside the drum portion 52. The drum portion is configured to hold the outer lead 35 such that the cushion member 53 is inelastic contact with the outer lead 35.

Attachment of Ferrule 36 to Glass Tube 34

Next, a process of attaching the ferrules 36 to the glass tubes 34 will be explained.

In the process, each glass tube 34 and the ferrules 36 are held by respective holding devices (not shown) and they are brought closely to each other with the axes thereof aligned. Then, the main bodies 37 are fitted onto the respective ends of the glass tube 34. As the glass tube goes further into the main bodies 37, the tip of each outer lead 35 passes through the corresponding main body 37 and starts entering inner space of the corresponding drum portion 52. After it passes through the drum portion 52, it starts entering inner space of the corresponding drum portion 42. When the holding devices (not shown) reach the predetermined mounting position, the ferrules 36 are brought to respective defined positions of the glass tube 34 in the axial direction thereof. As a result, the middle sections of the outer leads 35 are surrounded by the respective drum portions 52 and the top end sections of the outer leads 35 are surrounded by the respective drum portions 42. The tops of the outer leads 35 do not significantly project from the top edges of the drum portions 42. They are positioned slightly outside or slightly inside the drum portions 42, or in line with the top edges of the drum portions 42.

After the above process, each drum portion 52, 42 is swaged such that they are deformed to shrink in the radial direction. The swaged drum portion 42 and the corresponding outer leads 35 are fixed together by welding so as to be electrically conductive. The ferrules 36 and the glass tube 34 are integrated. Then, the assembly is complete and the discharge tube 15 is prepared. When the ferrules 36 are fitted onto the glass tube 34, the main bodies 37 are held substantially concentric with the glass tube 34, and the clearances 78 are provided between the periphery of the glass tube 34 and inner walls of the main bodies 37 around substantially the entire periphery.

Attachment of Discharge Tube 15 to Relay Connectors 14

The discharge tube 15 prepared by the above process is attached to the relay connectors 14 (see FIGS. 6, 8 and 9). To attach the discharge tube 15 to the relay connectors 14, the discharge tube 15 is held in the horizontal position and brought closer to the bottom of the chassis 13. Then, the ends of the glass tube 34 and the ferrules 36 are fitted into the holding areas 23 of the relay connectors 14. At this time, the main bodies 37 of the ferrules 36 push the elastic pressing pieces 32 so as to open them in the vertical direction. After they have passed through the smallest gap between the elastic pressing pieces 32, the elastic pressing pieces 32 draw the main bodies 37 into the holding areas 23 further back with elastic restoring forces thereof, and the main bodies 37 come in contact with the bottoms of the holding areas 23. Then, the attachment of the discharge tube 15 to the relay connectors 14 is complete.

The attached discharge tube 15 is held by the elastic pressing pieces 32 at the ends thereof, and mounted to the chassis 13 via the relay terminals 31 and the holders 20 that are the mounting bodies of the relay terminals 31. Under this condition, the weight of the discharge tube 15 affects the chassis 13 via the relay connectors 14 but not the outer leads 35 as loads.

The elastic pressing pieces 32 are in elastic contact with the peripheries of the main bodies 37. As a result, the outer leads 35 are electrically connected to the respective relay terminals 31 via the ferrules 36. Moreover, the glass tube 34 is pressed against the stoppers 26 around the recesses 27 and held due to elastic restoring forces of the elastic pressing pieces 32. A part of each main body 37 overlaps the corresponding stopper 26 when they are viewed in the axial direction of the discharge tube 15. Namely, a part of the edge of the main body 37 away from the conductive part 40 is closely located in the axial direction and faces the stopper 26.

The extending section 29 is formed so as to extend from the outer surface of the holder 20 perpendicular to the flat surface of the chassis 13 and having the opening of the escape opening 25 along the flat surface of the chassis 13 between the chassis 13 and the escape opening 25. Therefore, a distance that measures along surfaces of the parts of the holder 20 from the inner space of the holding area 23 to the front surface of the chassis 13 is large. As a result, a leak from the discharge tube 15 in the holding area 23 to the chassis outside the holder 20 is less likely to occur.

Overview of Power Board 16

As illustrated in FIG. 2, each power board 16 includes a circuit board 17, electronic components 19 and on-board connectors 18. On a rear surface (located away from the chassis 13) of the circuit board 17, an electrical circuit is formed. The electronic components 19 and the on-board connector 18 are mounted on the rear surface of the circuit board 17.

The circuit board 17 includes a paper phenol resin copper clad laminated board (called a paper phenol board) having a portrait rectangular overall shape. The circuit board 17 has mounting holes 17H (see FIG. 9), each of which has a portrait rectangular shape and runs from front to back. The mounting holes 17H are arranged from top to bottom along the right or the left edges of the circuit board 17 so as to correspond to the relay terminals 31 (or the relay connectors 14). Each on-board connector 18 includes a synthetic resin housing and an output terminal (not shown) made of metal (e.g., nickel-silver alloy) and entirely housed in the housing. The on-board connectors 18 are arranged along the right and the left edges of the circuit board 17 so as to correspond to the mounting holes 17H. Each housing has a mounting space (not shown) in the outer surface corresponding to the mounting hole 17H. A part of the output terminal faces the mounting space.

The power boards 16 are brought closely to the chassis 13 from the rear side such that the circuit boards 17 are positioned parallel to the chassis 13 and mounted to the chassis 13. To mount the power boards 16 to the chassis 13, the wall portion 22 and the board connecting portion 33 provided along the wall portion 22 are inserted in the concave portion 27 of the on-board connector 18 via the mounting hole 17H of the circuit board 17. As a result, the relay connector 14 and the on-board connector 18 are engaged and the relay terminal 31 is electrically connected to the output terminal.

In the lighting device 10 having the above configuration, the liquid crystal display device D including the lighting device 10, and the television receiver TV including the liquid crystal display device D, each discharge tube 15 in the lighting device 10 is configured as follows. The ferrule 36 is configured such that the relative position of each ferrule 36 (or the main body 37) to the glass tube 34 is defined with the holding part 50 that is separately provided from the conductive part 40. With this configuration, the ferrule 36 does not need to have cutouts for forming an elastic tab to hold the glass tube 34 with an elastic force. Therefore, the ferrule 36 (or the main body) is less likely to catch a part of the relay connector 14 (or the elastic pressing part 32) and improper attachment of the ferrule 36 to the relay connector 14 is less likely to occur.

The ferrule 36 is positioned on the outer side than the innermost end of the electrode 34a in the axial direction of the glass tube 34. By positioning the ferrule 36 on the outer side than the innermost end of the electrode 34a, a defect is less likely to be produced even when the ferrule 36 touches the glass tube 34. When the ferrule 36 touches a part of the glass tube 34 located on the inner side than the electrode 34a, an enclosure (e.g., mercury) around the area where the contact occurs becomes uneven and the area may become a dark spot. However, the ferrule 36 is located on the outer side than the innermost end of the electrode 34a in this embodiment. Therefore, the enclosure is less likely to become uneven even when the ferrule 36 touches the glass tube 34 and thus the dark spot is less likely to be produced.

The relative position of the ferrule 36 to the glass tube 34 is defined with the holding part 50. Therefore, the clearance 78 can be formed between the main body 37 and the glass tube 34. By forming the clearance 78 between the main body 37 of the ferrule 36 and the glass tube 34, the ferrule 36 is less likely to touch the glass tube 34. Therefore, the dark spot due to the unevenness of the enclosure is less likely to be created.

The ferrule 36 includes the main body 37 having a continuous outer surface without any cutouts. Because the relative position of the ferrule 36 to the glass tube 34 is defined with the holding part 50 in this embodiment, cutouts in the ferrule 36 for the positioning are not required. As a result, the outer surface of the main body 37 of the ferrule 36 is formed as a continuous surface without cutouts and thus improper attachment of the ferrule 36 to the relay connector 14 is less likely to occur.

The drum portion 42 where the connecting part 40 and the outer lead 35 are brought in contact and the drum part 52 where the holding part 50 and the outer lead 35 are brought in contact are positioned concentrically with each other. Because the contact portion 42 of the connecting part 40 and the contact portion 53 of the holding part 50, with which the outer lead 35 is in contact, are positioned concentrically with each other, the connecting part 40 and the holding part 50 are properly brought in contact with the outer lead 35. Namely, the contact portions of the connecting part 40 and the holding part 50 are concentrically positioned with the outer lead 35 that extends linearly and thus the outer lead 35 is brought into contact with and held by the connecting part 40 and the holding part 50 properly.

In this embodiment, mounting of each discharge tube 15 and electrical connection for supply power to the discharge tube 15 is complete at the same time only by fitting the ferrules 36 in the ferrule receiving portions 24 of the respective relay connectors 14. Improper fitting of the ferrules 36 in the ferrule receiving portions 24 is especially less likely to occur in this embodiment. Because the relative position of each ferrule 36 to the glass tube 34 is defined with the holding part 50 that is separately provided from the connecting part 40, an elastic tab in the ferrule 36 for holding the glass tube 34 with the ferrule 36 is not required. Therefore, the outer surface of each ferrule 36 is less likely to catch a part of the relay connector 14 in the ferrule receiving portions 24 and thus the improper attachment of the ferrule 36 to the relay connector 14 is less likely to occur.

The present invention is not limited to the above embodiments explained in the above description. The following embodiments may be included in the technical scope of the present invention, for example.

The ferrules 36 may be made of metal other than stainless steel, or made of electrically conductive resin or rubber.

The discharge tubes 15 are not limited to the cold cathode tubes. Other types of light sources including hot cathode tubes, xenon tubes and fluorescent tubes can be used.

The shape of the area of each conductive part 40 connected to the outer lead 35 is not limited to a drum shape so as to go all around the outer lead 35. The conductive part 40 may have a narrow portion formed in a substantially U shape or V shape and in contact with the outer lead 35. The conductive part 40 may have a plate-shape end that is in contact with the periphery of the outer lead 35. The end of the conductive part 40 may have a groove in which the outer lead 35 is fitted.

The shape of the area of each holding part 50 being in contact with the outer lead 35 (i.e., the holding area) is not limited to a drum shape so as to go all around the outer lead 35.

The switching components in the liquid crystal panel 11 of the liquid crystal display device D are not limited to the TFTs. The switching components other than the TFTs, such as metal insulator metal switching components, may be used. The display device is not limited to the liquid crystal display device D. Display devices having lighting devices behind the display panels can be used.

The invention claimed is:

1. A lighting device comprising:
a discharge tube; and
a terminal for supplying power to the discharge tube, wherein:
the discharge tube includes a glass tube, an electrode provided inside the glass tube, an outer lead provided at an end of the glass tube and configured to make electrical connection between the electrode and an external device, and a ferrule having a drum shape so as to be fitted onto the glass tube and configured to make electrical connection between the outer lead and the terminal; and
the ferrule includes a main body fitted onto the glass tube, a connecting part extending from the main body and electrically connected to the outer lead, and a holding part separately provided from the connecting part, extending from the main body and formed so as to hold the outer lead such that holding of the outer lead defines a relative position of the ferrule to the glass tube.

2. The lighting device according to claim 1, wherein the ferrule is positioned on an outer side than an innermost end of the electrode in an axial direction of the glass tube.

3. The lighting device according to claim 1, the main body and the glass tube have a clearance therebetween.

4. The lighting device according to claim 1, wherein the main body has a continuous outer surface without a cutout.

5. The lighting device according to claim 1, wherein the connecting part has a contact portion that is in contact with the outer lead and the holding part has a contact portion that is in contact with the outer lead, the contact portions are located concentrically with each other.

6. The lighting device according to claim 1, further comprising a chassis that houses the discharge tube, wherein:
the terminal is mounted to the chassis and has a ferrule receiving portion in which the ferrule of the discharge tube is fitted; and
the ferrule receiving portion is configured such that mounting of the discharge tube to the chassis and electrical connection for supplying power to the discharge tube are complete by fitting the ferrule in the ferrule receiving portion.

7. The lighting device according to claim 1, wherein:
the chassis includes a plate portion having flat surfaces;
the terminal is arranged on one of the surfaces of the plate portion located on a side on which the discharge tube is placed;
an inverter board is arranged on a surface of the plate portion located on a side opposite from the side on which the discharge tube is placed; and
the terminal is passed through the chassis and connected to the inverter board.

8. A display device comprising:
the lighting device according to claim 1; and
a display panel configured to provide display using light from the lighting device.

9. The display device according to claim 8, wherein the display panel is a liquid crystal panel using liquid crystal.

10. A television receiver comprising the display device according to claim 8.

* * * * *